W. M. ENGLISH & H. M. LICHTENSTEIN.
PUNCTURE PROOF CASING.
APPLICATION FILED OCT. 10, 1908.
952,072.
Patented Mar. 15, 1910.
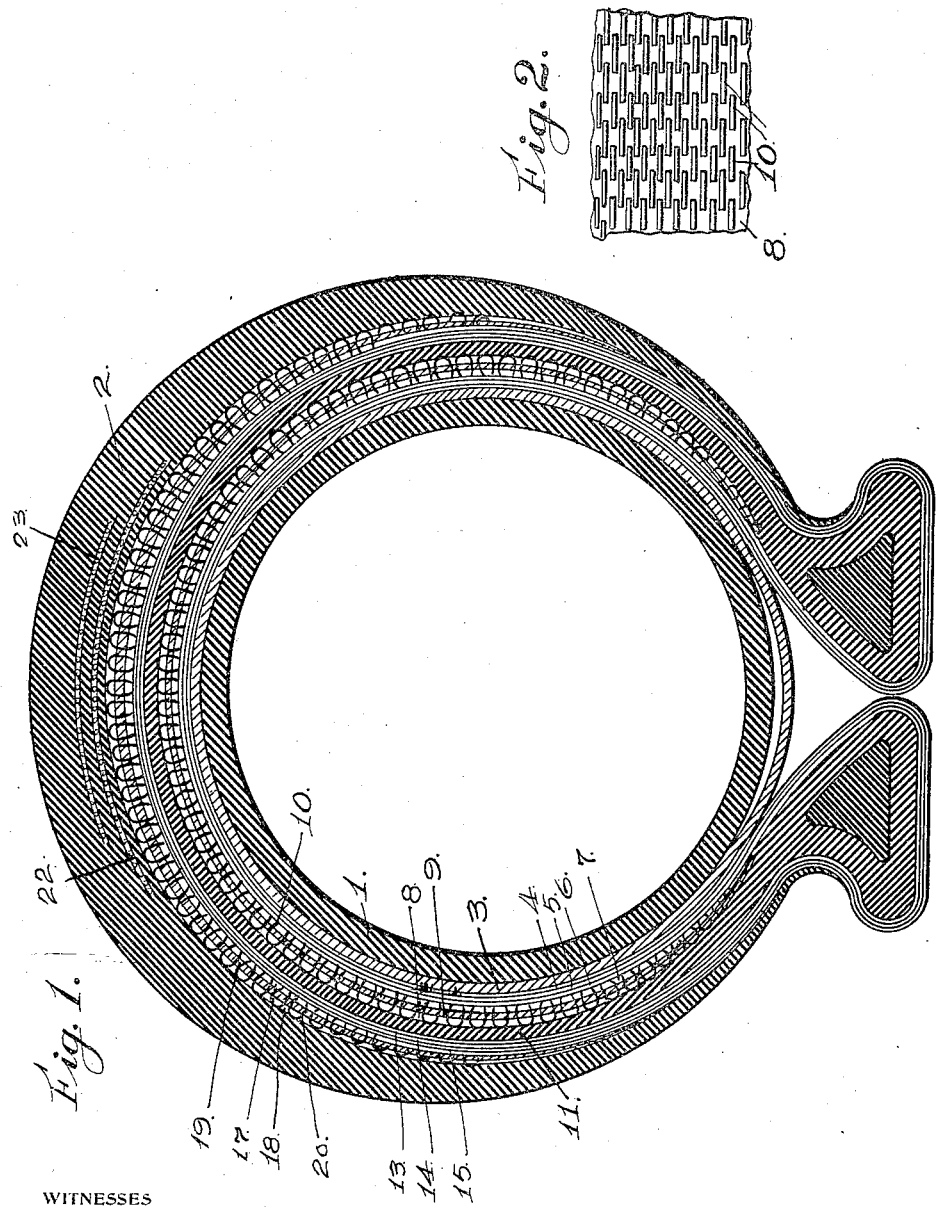

UNITED STATES PATENT OFFICE.

WILLIAM M. ENGLISH, OF SAUSALITO, AND HARRY M. LICHTENSTEIN, OF SAN FRANCISCO, CALIFORNIA.

PUNCTURE-PROOF CASING.

952,072.  Specification of Letters Patent.  Patented Mar. 15, 1910.

Application filed October 10, 1908. Serial No. 457,175.

*To all whom it may concern:*

Be it known that we, WILLIAM M. ENGLISH and HARRY M. LICHTENSTEIN, citizens of the United States, residing, respectively, at Sausalito, in the county of Marin, and San Francisco, in the county of San Francisco, State of California, have invented certain new and useful Improvements in Puncture-Proof Casings, of which the following is a specification.

The object of the present invention is to provide a casing which will be substantially proof against punctures, while yet sufficiently resilient for the purpose desired.

In the accompanying drawing, Figure 1 is a transverse sectional view of a portion of a tire formed in accordance with our invention; Fig. 2 is a broken horizontal section of the same taken above either of the compound layers.

Referring to the drawing, 1 indicates the usual inner tube and 2 indicates the outer tube or casing. Around the inner tube is a layer 3 of rawhide. Around said layer 3 of rawhide are three successive layers 4, 5, 6, of canvas cemented by, or embedded in, rubber. Over said layer is a compound layer of which the inner and outer layer sections 7, 8, are of canvas, and the intermediate layer 9 is of rawhide. These three layers are firmly united by small staples or clench nails 10, of a malleable iron, the ends of which are clenched into the inner section 7 of the compound layer. These staples are set together so closely that it is practically impossible for a nail or similar object to penetrate the compound layer thus formed. Over said compound layer is a layer 11 of rubber. Over the latter are three layers 13, 14, 15, of canvas cemented by, or embedded in, rubber. Over the latter is a second compound layer consisting of inner and outer layers 17, 18, of canvas, and an intermediate layer 19 of rawhide, which layers are firmly united by staples 20 in the same manner as the inner compound layer. The edges of the outer compound layer are chamfered. Over the latter compound layer is the outer casing or tread 2 in which there are embedded two layers 22, 23, of canvas.

In the place of or in addition to rawhide any known gum or vegetable fiber may be used.

An inferior form of the invention may be obtained by omitting one of the compound layers: but, in any case, the clench nails are set so closely together as to prevent penetration by any sharp object. The rawhide greatly strengthens the tire and prevents it bursting.

We claim:—

In a puncture proof casing, a compound layer having outer sections of fabric and an intermediate section of rawhide, all of said sections being secured together by clench nails set closely together to prevent penetration by a sharp object, substantially as described.

In testimony whereof we have hereunto set our hands in the presence of two subscribing witnesses.

WILLIAM M. ENGLISH.
HARRY M. LICHTENSTEIN.

Witnesses:
FRANCIS M. WRIGHT,
D. B. RICHARDS.